United States Patent

[11] 3,552,480

| [72] | Inventor | George V. Harris |
| | | Racine, Wis. |
| [21] | Appl. No. | 744,484 |
| [22] | Filed | July 12, 1968 |
| [45] | Patented | Jan. 5, 1971 |
| [73] | Assignee | Caterpillar Tractor Co. |
| | | Peoria, Ill. |
| | | a corporation of California, by mesne assignments |

[54] PATTERN FOR MAKING A SAND MOLD WITH A BACK DRAFT
14 Claims, 12 Drawing Figs.

[52] U.S. Cl. ................................................ 164/245,
164/45; 249/183
[51] Int. Cl. .................................................. B22c 7/00
[50] Field of Search ........................................ 164/245,
44; 249/183; 18/(Undercut Digest);
285/110—111; 287/189, 365

[56] References Cited
UNITED STATES PATENTS
| 2,384,360 | 9/1945 | Allen et al. ........................ | 285/110X |
| 2,614,310 | 10/1952 | James ........................... | 249/183X |
| 2,929,124 | 3/1960 | James ........................... | 249/183X |

Primary Examiner—Charles W. Lanham
Assistant Examiner—R. Spencer Annear
Attorney—James E. Nilles ABSTRACT: A composite metal and flexible material pattern for making a heat cured sand mold, the flexible material being used in the area of back draft to permit the use of a one piece pattern which can be removed without damage to the sand mold. The metal of the composite pattern functions to conduct heat to cure the resin bonded sand mold at a high curing heat. A method of making a sand mold of the heat-cured type. An improved product made from such a mold.

PATENTED JAN 5 1971

INVENTOR:
GEORGE V. HARRIS
BY: James E. Nilles
ATTORNEY

PATENTED JAN 5 1971
3,552,480
SHEET 2 OF 2
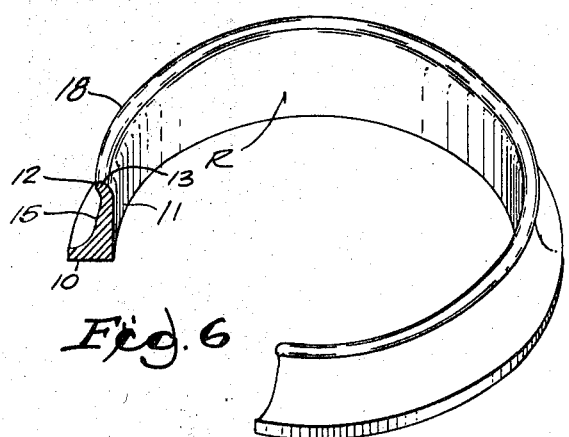
Fig.6
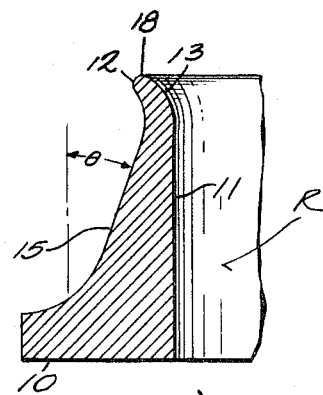
Fig.7
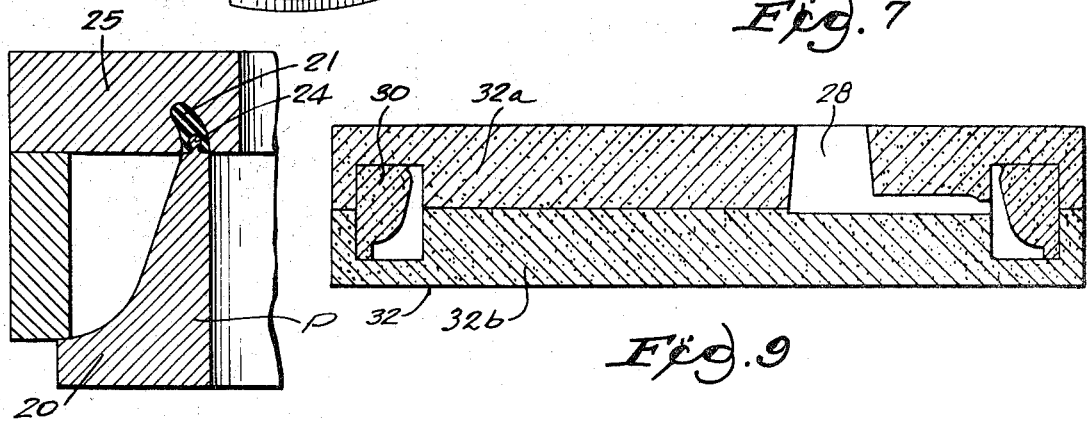
Fig.8
Fig.9
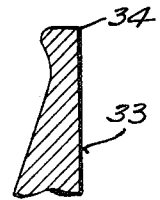
Fig.10  Fig.11
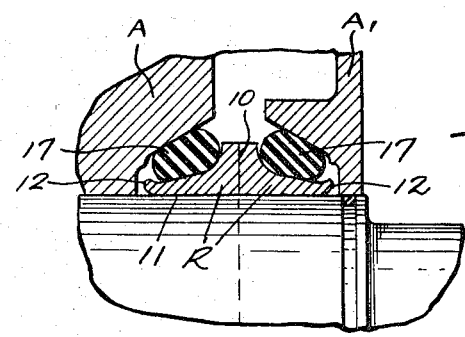
Fig.12
INVENTOR:
GEORGE V. HARRIS
BY: James E. Nilles
ATTORNEY

3,552,480

PATTERN FOR MAKING A SAND MOLD WITH A BACK DRAFT

BACKGROUND OF THE INVENTION

One aspect of the invention pertains generally to a pattern for making a sand mold. Such patterns have been made of rubber for accommodating back drafts when molding certain material.

These prior patterns have not been successful for making shell molds in which resin bonded sand is cured at a relatively high heat in a relatively short period of time. In making sand molds of this character, it has heretofor been necessary to make the pattern of three pieces if back draft areas were present in the mold. These patterns and molds were costly to make and incapable of high production rates.

SUMMARY OF THE INVENTION

The present invention provides a composite pattern for making a sand mold of the heat cured type, which pattern is made of metal and flexible material, the flexible material being bonded to the metal and functions to form the back draft area of the mold.

The invention provides a method of making a sand mold having a back draft and of heat cured sand such as resin bonded sand which may be cured at about 400° F. or more. The method includes providing a pattern of metal having flexible material bonded thereto, and with the flexible material arranged to form the area of back draft in the sand mold, placing heat curable resin bonded sand around the pattern, heating the sand to at least about 400° F. and withdrawing the pattern and thereby causing the flexible material to flex out of the back draft area of the sand mold and without damaging the sand mold. A more specific aspect of the invention contemplates the use of silicone rubber as the flexible material.

The present invention also provides a particularly shaped metal seal ring which has a rounded inner corner on its internal diameter which results from the novel pattern provided by the present invention and permits withdrawal of the pattern from the one piece sand mold.

BRIEF DESCRIPTION OF THE DRAWINGS

FIG. 6 is a perspective view, with a portion broken away, of a seal ring made in accordance with the present invention;

FIG. 7 is an enlarged, fragmentary, sectional view through a seal ring made in the mold shown in FIGS. 3, 4, and 5;

FIG. 8 is a cross-sectional view through a pattern of FIG. 2 and made in accordance with the present invention, but showing the negative mold used to cast the flexible material to the metal portion of the pattern;

FIG. 9 is a cross-sectional view through a conventional three piece mold for making a seal ring;

FIG. 10 is a fragmentary, cross-sectional view on an enlarged scale of a portion of a conventional seal ring made in the conventional mold shown in FIG. 9;

FIG. 11 is a fragmentary, sectional view of a seal ring made in accordance with the present invention, similar to the FIG. 7 showing, but in addition showing in dotted line the conventional corner of the conventional seal ring of FIG. 10;

FIG. 12 is a fragmentary, cross-sectional view through a shaft and its parts and showing a pair of seal rings in use and which have been made in accordance with the present invention.

DESCRIPTION OF THE PREFERRED EMBODIMENT

Figure 1:
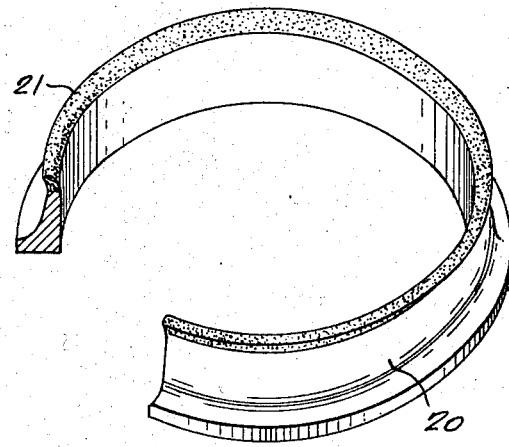
FIG. 1 is a perspective view of a pattern embodying the present invention for a mold for making a seal ring, a portion being shown as broken away and in section for clarity.
Figure 2:
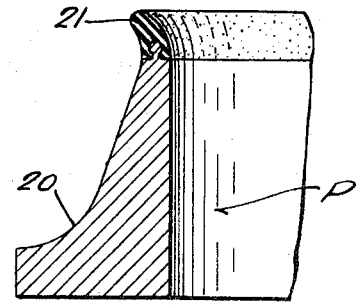
FIG. 2 is a cross-sectional view through FIG. 1, but on an enlarged scale.
Figure 3:
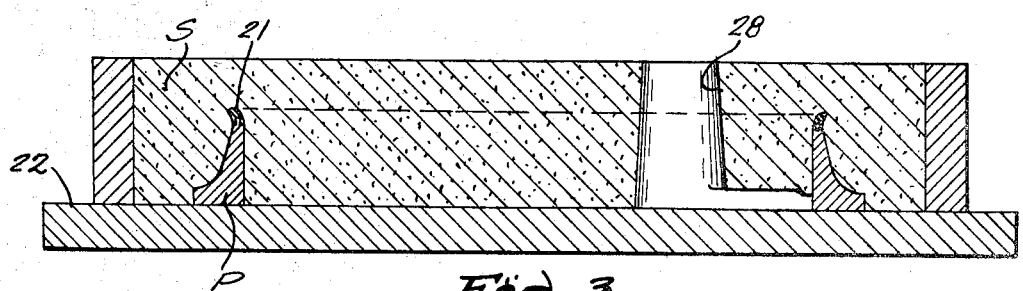
FIG. 3 is a cross-sectional view through a pattern as shown in FIG. 2 and as it is located in a sand mold.

The seal ring R made in accordance with the present invention, is shown in cross section in FIG. 7 and in perspective in FIG. 6. These extremely hard ferrous alloy rings are also shown in use in FIG. 12 and are slipped on a shaft in back-to-back relationship, that is with their radial surfaces 10 abutting against one another. A pair of metal parts A and A1, such as for example a track roller and a seal cover, respectively, are also mounted on the shaft and must be sealed.

The rings are mounted on the shaft by their generally cylindrical and axially extending central opening, defined by their relatively long internal, cylindrical surface 11. The small end 12 (FIG. 7) of a ring has a rounded corner 13 extending from the cylindrical surface 11 and then curves radially away from the surface 11. The rounded internal corner 13 at the junction of the central opening of the ring, is important and will be referred to later. The ring R also has an external, annular inclined surface 15 which diverges in an axial direction away from the smaller end of the ring R. The angle $\theta$ of this inclination is about 15° from the longitudinal axis, as shown in FIG. 7. This inclined surface 15, is inclined radially outwardly in a direction away from the part P or P1 against which its O-ring will seal. It is on this inclined surface that a flexible O-ring seal 17 is mounted so that when assembled, the seal 17 is pushed against the metal part to thereby urge it into sealing position.

Referring again to the shape of the metal seal ring R, it has a generally radially extending flange 18 which extends radially beyond a portion of the inclined surface 15 and functions to hold the flexible O-ring seal 17 on the ring R until final assembly of the parts and seals can be made. Thus the small rounded flange 18 forms an important part of the metal seal ring R, and the ring R must be made precisely and with a good finish so as to prevent injury to the flexible seal 17 and also to insure accurate and easy assembly. The surface 10 of each of the ring R is precisely finished to form a seal against the adjacent surface 10 of the adjacent ring R.

The ring is preferably made of Stellite, and is made by a shell molding process and by a novel mold pattern now to be described.

A one-piece pattern P is made of a relatively larger, metal portion 20, for example of aluminum. A portion of the pattern 21 is also formed of flexible material, and silicone rubber has been found to be particularly desirable in this respect. Other flexible materials may be used, such as for example, teflon, which are resistant to the high heat necessary to cure the resin bonded sand S of which the mold is to be made. The invention will be described as using silicone rubber as the flexible material.

When a mold is to be made, the pattern P is placed on a heated surface 22, such as for example, a heated table used in core making machines of the type shown in the copending application Ser. No. 719,130, filed Apr. 5, 1968, now U.S. Pat. No. 3,516,477, and assigned to Harris Metals, Inc., to an assignee common with the present invention. If a description of the means and method for placing the sand S around the pattern P is deemed to be either necessary or desirable, reference may be had to that application. However, it is believed sufficient to say for purposes of this disclosure, that the pattern P and the resin-bonded sand S which is poured over the pattern P, are heated to cure the sand. Preferably, a curing temperature at least about 400° F. is used with the present invention, which gives good production rates. Of course lower temperatures can be used, but undesirably long curing times are then required.

The entire pattern P is of a shape such as above described for the finished seal ring R, and it will be noted that the silicone rubber forms only a relatively small portion of the whole pattern. The rubber is provided for that portion of the pattern which will form the back draft portion of the sand mold, namely, that portion which ultimately forms the rounded flange 18 of the ring R.

The silicone rubber used in the present pattern not only can withstand the necessary curing heat, but it is of a sufficient durometer hardness to hold its proper shape during the sand-filling operation of the mold box and pattern, and also during the heat curing of the mold. On the other hand, the silicone rubber has sufficient resiliency to be withdrawn from the cured mold, as will appear, without damage to itself or to the mold. A durometer hardness of about 40 to 50 has been found to be very satisfactory.

As shown in FIG. 8, in making the pattern P, the silicone rubber is fixed or bonded to the metal portion 20 of the pattern by injection molding, and the metal portion 20 has an undercut projection 24 around which the rubber flows in binding relationship in the negative mold 25 which is used to cast the rubber on the end of the metal portion 20 of the pattern. Variously shaped, roughened or notched surfaces may be used on the end of the metal portion of the pattern to insure a good connection with the rubber portion.

Figure 4:
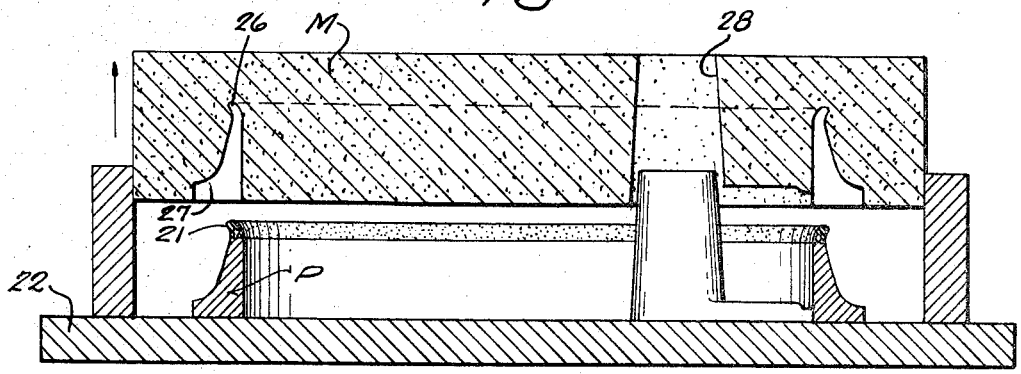
FIG. 4 is a view similar to FIG. 3 but showing the cured sand mold being removed.
Figure 5:
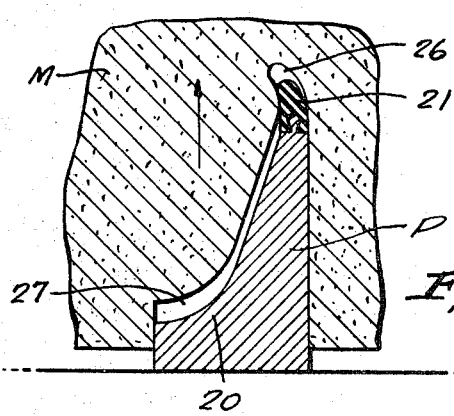
FIG. 5 is an enlarged view of a portion of the FIG. 3 arrangement, but with the mold as it is partially removed and with the pattern back draft portion deformed.

As shown in FIG. 4, after the sand mold M has been heat cured, the pattern P is removed or the mold is lifted from the pattern. FIG. 5 shows this initial relative movement during which the silicone rubber portion 21 of the one piece pattern P must be withdrawn from the back draft area 20 of the mold. As shown in FIG. 5, the pattern has been partially removed, the silicone rubber deforming temporarily so as to pass from the back draft area 26 and into the larger, unrestricted area 27 of the mold.

FIG. 9 illustrates a conventional three piece, sand mold previously used, the inner sand mold part 30 being of a ring shape and set within the outer mold part 32 which is formed in halves 32a and 32b. Considerable labor is required in manufacturing and assembling these three mold pieces which were previously required to form metal parts with back draft areas.

Passages 28 have also been formed in the mold through which the metal is poured in casting the finished parts.

FIG. 10 shows the shape of the flange end of a seal ring 33 made on the conventional three-piece mold of FIG. 9. It will be noted that inside corner 34 is square.

FIG. 11 shows a comparison of the cross-sectional shapes of the ring R made with the present invention and the ring 33 made by conventional means. By making the inner corner of a round shape as in ring R, the silicone rubber can be withdrawn from the mold, as shown in FIG. 5. If the corner were square, the extra rubber material in the square corner are 35 (FIG. 11) would not permit twisting of the flange-shaped, silicone rubber 21 in an axially direction (to the right as viewed in FIG. 4) as the rubber 21 is being pulled from the back draft area 26.

With the present invention, it is possible to provide a one piece pattern for making a heat cured mold having a back draft area, and from resin-bonded sand, for use in a shell-molding process. The metal portion 20 of the pattern P acts to conduct the necessary curing heat from the heated surface 22 and to the sand. The larger metal portion 20 also can transfer the necessary heat to the sand which surrounds the smaller rubber portion 21 of the pattern. Thus the metal is required to properly and adequately conduct the heat, but an all metal pattern could not be used. On the other hand, a pattern of all flexible material could not be used in this mold-making process.

Thus the present invention provides an improved one piece pattern for making a single cavity from which the pattern can be extracted. This invention also provides an improved method for making a heat cured, sand mold, and also provides an improved product.

I claim:

1. A pattern for forming a heat-cured sand mold having a back draft area, said pattern comprising, a substantially annular metal portion tapering convergently from a base to form that portion of the mold which has no back draft area, a flexible portion for forming a back draft area in said mold which is diametrically smaller than said metal portion and secured along the small end of said metal portion opposite said base and of a normal unflexed shape which complements the back draft area of said mold, said flexible portion being of a sufficient hardness so as not to deform during heat curing of the mold, and said flexible portion also being of sufficient resiliency to deform and pass out of said back draft area of said mold without damage to the latter as said mold and pattern are separated.

2. A pattern for forming a heat-cured said mold having a back draft area, said pattern comprising, a substantially annular metal portion tapering convergently from a base to form that portion of the mold which has no back draft area, a silicone rubber portion for forming a back draft area in said mold which is diametrically smaller than said metal portion and secured along the small end of said metal portion opposite to said base and of a normal unflexed shape which complements the back draft area of said mold, said rubber being of a sufficient hardness so as not to deform during heat curing of the mold, and said rubber also being of sufficient resiliency to deform and pass out of said back draft area of said mold without damage to the latter as said mold and pattern are separated.

3. A pattern for forming a heat-cured sand mold having a back draft area, said pattern comprising, substantially annular metal portion tapering convergently from a base to form that portion of the mold which has no back draft area, said metal portion having an irregular surface on the end opposite said base, a flexible portion for forming a back draft area in said mold which is diametrically smaller than said metal portion and molded and bonded to said irregular surface on the end of said metal portion, said flexible portion being of a normal unflexed shape which complements the back draft area of said mold, said flexible portion being of a sufficient hardness so as not to deform during heat curing of the mold, and said flexible portion also being of sufficient resiliency to deform and pass out of said back draft are of said mold without damage to the latter as said mold and pattern are separated.

4. A pattern for forming a heat-cured sand mold having a back draft area, said pattern comprising, a substantially annular metal portion tapering convergently from a base to form that portion of the mold which has no back draft area, said metal portion having a generally cylindrical and axially extending central opening and also having an external surface inclined to the longitudinal axis of said metal portion and forming a large end and a small end of said metal portion, a flexible portion for forming a back draft area in said mold diametrically smaller than and secured along the small end of said metal portion opposite said base and of a normal shape which complements the back draft area of said mold, said flexible portion forming a generally radially extending flange extending from said small end of said metal portion, said flexible portion also having a rounded internal corner joining one end of said central opening and the rest of said flange, said flexible portion being of a sufficient hardness so as not to deform during heat curing of the mold, and said flexible portion also being of sufficient resiliency to deform and pass out of said back draft area of said mold without damage to the latter as said mold and pattern are separated.

5. A composite pattern for forming a cured sand mold having an internal back draft portion comprising:

a rigid partial pattern portion convergently tapering from a base and not having any back draft portions which is capable of being withdrawn from a cured sand mold without disturbing said cured sand mold, said rigid partial pattern forming a substantial portion of said composite pattern;

a flexible partial pattern portion for forming any back draft portions of said composite pattern, said flexible partial portion having sufficient rigidity to maintain dimension and configuration during formation of the mold cavity when covered with a sand mixture to be cured and sufficient resilience to egress from such back draft portions and when said composite pattern is removed as a unit after the sand mold is cured; and interconnecting means for holding said rigid partial pattern portion and said flexible partial pattern portion in tight registry on the end opposite said base to form a precision composite pattern that can be removed from a cured sand mold with an internal back draft without disrupting the same.

6. The composite pattern as defined in claim 5 wherein the interconnecting means includes a structure on the rigid partial pattern portion to which the flexible partial pattern portion is bonded.

7. The composite pattern as defined in claim 5 wherein the flexible partial pattern portion is tapered having a decreasing cross section from its connection to the rigid partial portion to its extremities to facilitate its removal from a cured sand mold.

8. The composite pattern as defined in claim 5 wherein the interconnecting means includes an undercut projection to which the flexible partial pattern portion is bonded thereby holding said flexible partial pattern portion in tight registered engagement with said rigid partial pattern portion.

9. The composite pattern as defined in claim 5 wherein the composite pattern has a circular configuration with a flaring back draft portion formed with the flexible partial pattern portion.

10. The composite pattern as defined in claim 5 wherein the flexible partial pattern portion is formed of an elastomer with dimensional stability at temperatures employed to cure a precision sand mold employing a thermally cured resin and sand mixture.

11. The composite pattern as defined in claim 10 wherein the elastomer is silicon rubber.

12. The composite pattern as defined in claim 10 wherein the rigid partial pattern portion is formed of metal.

13. The composite pattern as defined in claim 5 wherein both the rigid and partial pattern portion and the flexible partial pattern are cylindrical and joined in axial registry by the interconnecting means.

14. The composite pattern as defined in claim 13 wherein the flexible partial pattern portion includes an oblique diverging flange that is the back draft portion and is joined to the rigid partial pattern portion where it tapers continuously to a decreasing cross section.